(12) United States Patent
Li et al.

(10) Patent No.: US 10,485,006 B2
(45) Date of Patent: Nov. 19, 2019

(54) JUDGMENT METHOD OF CHANNEL OCCUPANCY AND JUDGMENT DEVICE

(71) Applicant: YULONG COMPUTER TELECOMMUNICATION SCIENTIFIC (SHENZHEN) CO., LTD., Shenzhen (CN)

(72) Inventors: Ming-Ju Li, Shenzhen (CN); Ya-Jun Zhu, Shenzhen (CN); Yun-Fei Zhang, Shenzhen (CN)

(73) Assignee: YULONG COMPUTER TELECOMMUNICATION SCIENTIFIC (SHENZHEN) CO., LTD, Shenzhen (CN)

( * ) Notice: Subject to any disclaimer, the term of this patent is extended or adjusted under 35 U.S.C. 154(b) by 37 days.

(21) Appl. No.: 16/068,128

(22) PCT Filed: Aug. 29, 2016

(86) PCT No.: PCT/CN2016/097088
§ 371 (c)(1),
(2) Date: Jul. 4, 2018

(87) PCT Pub. No.: WO2017/118053
PCT Pub. Date: Jul. 13, 2017

(65) Prior Publication Data
US 2019/0021094 A1    Jan. 17, 2019

(30) Foreign Application Priority Data

Jan. 5, 2016  (CN) .......................... 2016 1 0010114

(51) Int. Cl.
*H04W 72/10* (2009.01)
*H04W 16/14* (2009.01)
(Continued)

(52) U.S. Cl.
CPC .......... *H04W 72/10* (2013.01); *H04B 17/345* (2015.01); *H04W 16/14* (2013.01);
(Continued)

(58) Field of Classification Search
CPC ... H04L 5/0042; H04B 17/309; H04B 17/345; H04W 4/021; H04W 16/10; H04W 16/14;
(Continued)

(56) References Cited

U.S. PATENT DOCUMENTS

2010/0020760 A1    1/2010 Grandblaise et al.
2015/0365931 A1*  12/2015 Ng et al.

FOREIGN PATENT DOCUMENTS

| CN | 103369690 A | 10/2013 |
| CN | 104540164 A | 4/2015 |
| CN | 104812032 A | 7/2015 |

OTHER PUBLICATIONS

Comments of QUALCOMM Incorporated (Year: 2015).*
(Continued)

*Primary Examiner* — Walter J Divito
*Assistant Examiner* — Dharmesh J Patel
(74) *Attorney, Agent, or Firm* — ScienBiziP, P.C.

(57) ABSTRACT

A judgment method of channel occupancy is provided, the method includes: filtering small cells satisfying conditions into a first set according to geographical positions of the small cells and a clear channel detection result; filtering small cells satisfying another conditions into a second set according to interference between small cells, or dividing into a third set; dividing the small cells in the second set into an active set and a restrained set according to priorities and the geographical positions of the small cells; sending transmission control signaling to small cells in the third set, the active set and the restrained set. By utilizing the present disclosure, reasonability of allocation of channel resources (Continued)

can be improved when interior of a small cell system, a Licensed Assisted Access (LAA) system and a Wi-Fi system are coexisted, and system performance can be improved.

15 Claims, 4 Drawing Sheets

(51) Int. Cl.
    *H04B 17/345*     (2015.01)
    *H04W 16/32*     (2009.01)
    *H04W 4/021*     (2018.01)
    *H04W 72/08*     (2009.01)

(52) U.S. Cl.
    CPC ............ *H04W 16/32* (2013.01); *H04W 4/021* (2013.01); *H04W 72/082* (2013.01)

(58) Field of Classification Search
    CPC ..... H04W 16/16; H04W 16/32; H04W 24/10; H04W 72/08; H04W 72/10; H04W 72/12; H04W 72/082; H04W 84/12; H04W 84/042
See application file for complete search history.

(56) References Cited

OTHER PUBLICATIONS

3GPP Evolved Universal Terrestrial Radio Access (E-UTRA); FDD Home eNode B (HeNB) Radio Frequency (RF) requirements analysis (3GPP TR 36.921 Version 10.0.0, Apr. 30, 2011); 45 pages.
3GPP Technical Specification Group Radio Access Network; Study on Licensed-Assisted Access to Unlicensed Spectrum (3GPP TR 36.889 Version 13.0.0, Jun. 30, 2015); 87 pages.

* cited by examiner

JUDGMENT METHOD OF CHANNEL OCCUPANCY AND JUDGMENT DEVICE

CROSS-REFERENCE TO RELATED APPLICATIONS

This application claims priority of Chinese Patent Application No. 201610010114.3, entitled "judgment method of channel occupancy and judgment device," filed on Jan. 5, 2016 in the SIPO (State Intellectual Property Office of the People's Republic of China), the entire contents of which are incorporated by reference herein.

FIELD

The embodiments of the present disclosure relates to a technical field of communication, specifically a judgment method of channel occupancy and a judgment device.

BACKGROUND

With the popularization of Long Term Evolution (LTE) technology, growth spurt of wireless data flow is realized, and requirements of the cellular data system on frequency spectrum resources is continuously intensified. A Licensed Assisted Access (LAA) small cell is proposed in the 3 GPP standard (Release 13), and the small cell is not only deployed in existing licensed frequency spectrums, but also deployed in unlicensed frequency spectrums, thus, the spectrum resources can be fully utilized. However, coexistence of the LAA and the Wireless Fidelity (Wi-Fi) in unlicensed 5 Ghz frequency bands is the largest challenge.

For avoiding generation of collisions, in the prior art, Listen-before-talk (LBT) is applied in an LTE system. The LBT includes a load based equipment (LBE) and a frame based equipment (FBE). Under a FBE mechanism, LAA carries out a clear channel assessment (CCA) detection on a specific subframe. If a CCA detection result indicates that a channel is idle, data is started to transmit immediately. The channel will be occupied for a maximum channel occupation duration or the data cache area is empty. Due to the coexistence of LAA and Wi-Fi, regarding a trend for intensively deploying LAA in 5G, all the LAA under a same operator adopts a channel detection scheme based on FBE, a CCA detection and a data transmission are periodically and synchronously carried out before sending the data. This results in collisions caused by a plurality of adjacent LAA that simultaneously transmit data, so that the inter-cell interference is serious, system performance is deteriorated, and it is not easy to peacefully coexist with a Wi-Fi system. For a licensed frequency spectrum, if small cells are deployed super intensively in the same frequency band, if all the small cells send at the same time when sending data, the system performance is also deteriorated due to a serious interference between the adjacent cells.

SUMMARY

The technical problem to be solved by embodiments of the present disclosure is to provide a judgment method of channel occupancy and a judgment device, for solving the problems of serious inter-cell interferences and deterioration of system performance caused by more collisions when a licensed assisted access (LAA) system and a Wi-Fi system is coexisted. Meanwhile, the problems of serious interferences and further deterioration of the system performance as all small cells sent data simultaneously when ultra-dense networks are deployed in a licensed frequency spectrum.

In order to solve the above technical problem, an embodiment of the present disclosure provides a judgment method of channel occupancy, which includes: clustering according to geographic position information of small cells on a same frequency band, each of the small cells being a small cell working in a licensed frequency spectrum or a LAA cell working in an unlicensed spectrum; when all of the small cells are small cells working in the licensed frequency spectrum, dividing the small cells in a cluster into a first set, or when all of the small cells are small cells working in the unlicensed frequency spectrum, after executing a clear channel assessment (CCA) on LAA cells in the cluster periodically and synchronously, dividing LAA cells whose channels are detected to be idle into the first set; calculating an interference value between every two small cells in the first set and comparing with a preset interference threshold value, and dividing a small cell combination having an interference value larger than the preset interference threshold value into a second set, or dividing a small cell combination having an interference value equaling to or small than the preset interference threshold value into a third set; receiving priority information reported by each of small cells in the second set, and dividing the small cells in the second set into an active set and a restrained set according to the priority information and the geographic position information of each of the small cells; sending transmission control signaling to small cells in the third set, the active set and the restrained set, to make the small cells in the third set and the small cells in the active set start transmitting data after receiving the transmission control signaling, and to make the small cells in the restrained set enter a non-sending state within a channel occupation period after receiving the transmission control signaling.

The priority information is determined by a small cell according to a scheduling level factor of a terminal scheduled by the small cell, and the scheduling level factor is used for representing a priority sequence of the terminal being scheduled. When there are a plurality of terminals exists, the maximum value of scheduling level factors of the plurality of terminals is selected to be a priority of the small cell.

The priority is calculated according to the following formula:

$$\beta_k = \max_i \left\{ -lg(\delta_i) \cdot \frac{R_i(t)}{\overline{R_1(t)}} \cdot \frac{D_i(t)}{T_i} \cdot \frac{1}{Q_{QCI}} \right\}$$

In the formula, $\beta_k$ is a priority of the $k^{th}$ small cell in the first set in the same cluster, $\delta_i$ is a ratio upper limit of data packets that exceed the maximum time delay and can be tolerated by a scheduled terminal i, $R_i(t)$ is the maximum data rate of the scheduled terminal i at the current t moment, $\overline{R_1(t)}$ is an average data rate of the scheduled terminal i, $D_i(t)$ is a queue time delay of a to-be-sent data cache area of the scheduled terminal i, $T_i$ is the maximum time delay that can be tolerated by the scheduled terminal i, $Q_{QCI}$ is a requirement grade identification of quality of service (QoS) corresponding to data service to be sent by the scheduled terminal i.

In the judgment method, dividing the small cells in the second set into an active set and a restrained set according to the priority information and the geographic position information of each of the small cells includes: initializing the activity set and the restrained set; selecting a small cell m with a current highest priority in the second set as a starting point, adding the small cell m into the active set, calculating an interference value between each of the other small cells in the second cell and the small cell m after the small cell m is removed from the second set, comparing the interference value with the preset interference threshold value, and adding a small cell with an interference value larger than the preset interference threshold value into the restrained set, and removing small cells included in a union set of the current activity set and the restrained set from the second set; updating the starting point, and repeatedly executing the step of selecting the small cell into the active set and the restrained set until the second set becomes an empty set.

The transmission control signaling is transmitted through a licensed frequency band or through an interface between base stations.

Correspondingly, an embodiment of the present disclosure further provides a judgment device of channel occupation, which includes: a clustering unit configured to cluster according to geographic position information of small cells on a same frequency band, each of the small cells being a small cell working in a licensed frequency spectrum or a LAA cell working in an unlicensed spectrum; a first dividing unit, configured to divide small cells in a cluster into a first set when all of the small cells are small cells working in the licensed frequency spectrum, or execute a clear channel assessment (CCA) on LAA cells in the cluster periodically and synchronously when all of the small cells are small cells working in the unlicensed frequency spectrum, and divide LAA cells whose channels are detected to be idle into the first set; a calculation unit configured to calculate an interference value between every two small cells in the first set and compare with a preset interference threshold value, and divide a small cell combination having an interference value larger than the preset interference threshold value into a second set, or divide a small cell combination having an interference value equaling to a small than the preset interference threshold value into a third set; a second dividing unit configured to receive priority information reported by each of small cells in the second set, and divide the small cells in the second set into an active set and a restrained set according to the priority information and the geographic position information of each of the small cells; a sending unit configured to send transmission control signaling to small cells in the third set, the active set and the restrained set, to make the small cells in the third set and the small cells in the active set start transmitting data after receiving the transmission control signaling, and to make the small cells in the restrained set enter a non-sending state within a channel occupation period after receiving the transmission control signaling.

The priority information is determined by a small cell according to a scheduling level factor of a terminal scheduled by the small cell, and the scheduling level factor is used for representing a priority sequence of the terminal being scheduled. When there are a plurality of terminals exists, the maximum value of scheduling level factors of the plurality of terminals is selected to be a priority of the small cell.

The priority is calculated according to the following formula:

$$\beta_k = \max_i \left\{ -lg(\delta_i) \cdot \frac{R_i(t)}{\overline{R_1(t)}} \cdot \frac{D_i(t)}{T_i} \cdot \frac{1}{Q_{QCI}} \right\}$$

In the formula, $\beta_k$ is a priority of the $k^{th}$ small cell in the first set in the same cluster, $\delta_i$ is a ratio upper limit of data packets that exceed the maximum time delay and can be tolerated by a scheduled terminal i, $R_i(t)$ is the maximum data rate of the scheduled terminal i at the current t moment, $\overline{R_1(t)}$ is an average data rate of the scheduled terminal i, $D_i(t)$ is a queue time delay of a to-be-sent data cache area of the scheduled terminal i, $T_i$ is the maximum time delay that can be tolerated by the scheduled terminal i, $Q_{QCI}$ is a requirement grade identification of quality of service (QoS) corresponding to data service to be sent by the scheduled terminal i.

The second dividing unit is specifically configured to: initialize the activity set and the restrained set; select a small cell m with a current highest priority in the second set as a starting point, add the small cell m into the active set, calculate an interference value between each of the other small cells in the second cell and the small cell m after the small cell m is removed from the second set, compare the interference value with the preset interference threshold value, and add a small cell with an interference value larger than the preset interference threshold value into the restrained set, and remove small cells included in a union set of the current activity set and the restrained set from the second set; update the starting point, and repeatedly execute the step of selecting the small cell into the active set and the restrained set until the second set becomes an empty set.

The transmission control signaling is transmitted through a licensed frequency band or through an interface between base stations.

The embodiment of the present disclosure has following beneficial effects:

Through clustering, a clear channel assessment (CCA) detection, comparing with the preset interference threshold value, and multilevel filtering the small cells according to the priority information and the geographical location information, and through restraining a part of the small cells that cause interferences to the adjacent cells to send data, system interference of the inter-cell is reduced, the overall performance of the system is improved, and the interior of the small cell system, the LAA system and the Wi-Fi system can be coexisted better.

BRIEF DESCRIPTION OF THE DRAWINGS

In order to describe the technical solutions in the embodiments of the present disclosure or the prior art more clearly, the following briefly introduces the accompanying drawings needed for describing the embodiments or the prior art, obviously, the accompanying drawings in the following description merely show some embodiments of the present disclosure, and persons of ordinary skill in the art may derive other drawings from these accompanying drawings without creative efforts.

DETAILED DESCRIPTION

With the accompanying drawings in the embodiments of the present disclosure described below, the technical scheme in the embodiment of the present disclosure is clearly and completely described, apparently, the described embodiments are merely a part of the embodiments of the present disclosure rather than all embodiments. Based on the embodiments of the present disclosure, all other embodiments obtained by persons of ordinary skill in the art without creative efforts shall fall within the protection scope of the present disclosure.

Figure 1:
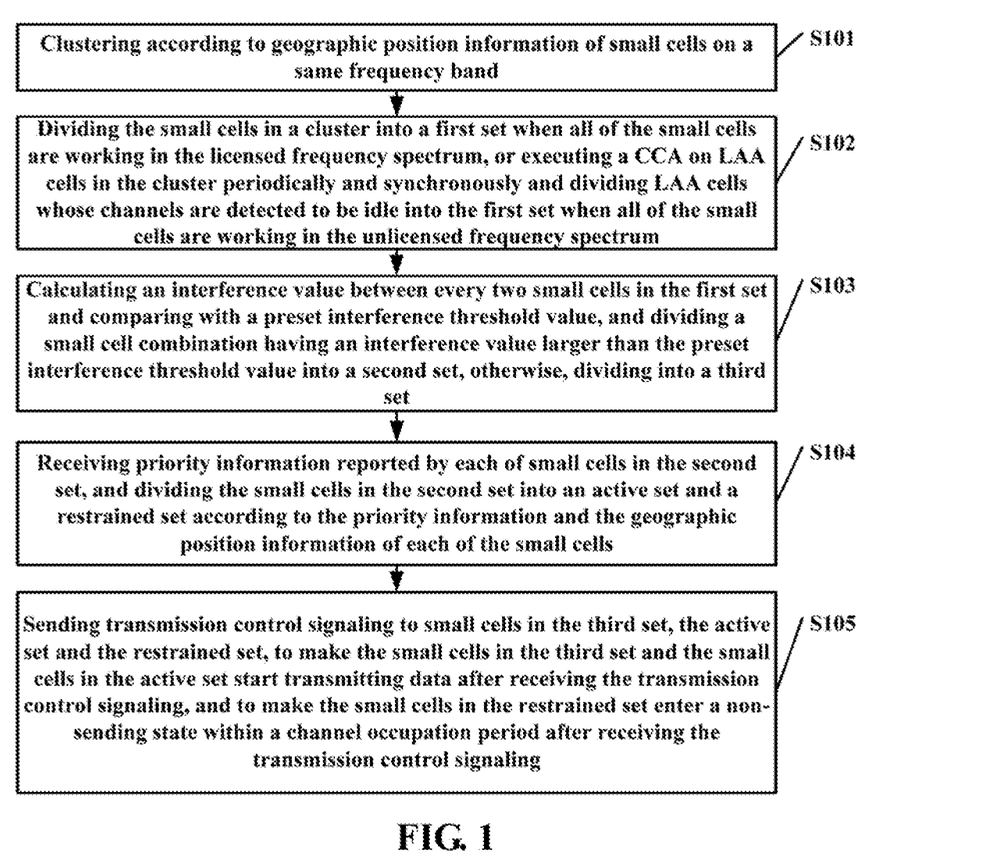
FIG. 1 is a flow diagram of a first embodiment of a judgment method of channel occupancy according to the present disclosure.

Please refer to FIG. 1, which is a flow diagram of a first embodiment of a judgment method of channel occupancy according to the present disclosure, in the embodiment, the judgment method includes following steps:

S101, clustering according to geographic position information of small cells on a same frequency band.

Each of the small cells is a small cell working in a licensed frequency spectrum or each of the small cells is a LAA cell working in an unlicensed spectrum.

Specifically, a judgment function entity can read the geographic position information, such as coordinate information, of each of the small cells, mark adjacent small cells as a same cluster. The small cells in the cluster share information and are uniformly controlled by the judgment function entity. Dynamic allocation and intelligent management of resources are realized, and control signaling is borne. A licensed frequency band resource is occupied by information interaction between the judgment function entity and the small cells in the cluster, information of all of the small cells in the cluster can be updated periodically, and various algorithms can be realized through functions of software programming.

S102, when all of the small cells are small cells working in the licensed frequency spectrum, dividing the small cells in a cluster into a first set, or when all of the small cells are small cells working in the unlicensed frequency spectrum, after executing a clear channel assessment (CCA) on LAA cells in the cluster periodically and synchronously, dividing LAA cells whose channels are detected to be idle into the first set.

As the licensed frequency spectrum is licensed, that is, no other systems such as Wi-Fi system can be used on the licensed frequency band, thus all small cell base station sending points on the licensed frequency band do not need to perform any channel detection before occupying the channel, and a channel can be directly occupied, for small cells working in a licensed frequency spectrum, the small cells in the cluster can be completely divided into the first set. For LAA cells working in the unlicensed frequency spectrum, the LAA cells whose channels are detected to be idle are divided into the first set.

For the unlicensed frequency spectrum, all LAA small cells deployed by the same operator in the cluster will carry out a clear channel assessment (CCA) detection periodically and synchronously. Preliminary filtering of the LAA small cells can be realized through the CCA detection. The LAA small cells that pass the CCA successfully are selected for subsequent further filtering, and finally a LAA small cell set whose transmission requirements and preferable usage resources can be satisfied preferentially, and a LAA small cell set whose transmission requirements can be temporarily ignored and that does not occupy resources temporarily, are acquired.

S103, calculating an interference value between every two small cells in the first set and comparing with a preset interference threshold value, and dividing a small cell combination having an interference value larger than the preset interference threshold value into a second set, or dividing a small cell combination having an interference value equaling to or small than the preset interference threshold value into a third set.

The preset interference threshold value can be set by the judgment function entity according to historical data, and can also be set by a user according to experience, the embodiments of the present disclosure are not limited in any way.

The small cells in the first set can be further filtered through the interference threshold value, small cells with large mutual interference are combined into pairs or combinations, and then divided into the second set.

S104, receiving priority information reported by each of small cells in the second set, and dividing the small cells in the second set into an active set and a restrained set according to the priority information and the geographic position information of each of the small cells.

After division based on a comparison with the preset interference threshold value, the small cells in the second set can actively calculate own priority and report obtained priority information to the judgment function entity, or the judgment function entity can instruct the small cells in the second set to execute steps of calculating the priority and reporting the obtained priority information.

Specifically, the priority information is determined by a small cell according to a scheduling level factor of a terminal served and activated by the small cell, a data cache area of the terminal is not empty. The scheduling level factor is used for representing a priority sequence of the terminal being scheduled. When there are a plurality of terminals exists, the maximum value of scheduling level factors of the plurality of terminals is selected to be a priority of the small cell.

The priority is specifically calculated according to the following formula:

$$\beta_k = \max_i \left\{ -lg(\delta_i) \cdot \frac{R_i(t)}{\overline{R_1(t)}} \cdot \frac{D_i(t)}{T_i} \cdot \frac{1}{Q_{QCI}} \right\}$$

In the formula, $\beta_k$ is a priority of the $k^{th}$ small cell in the first set in the same cluster, $\delta_i$ is a ratio upper limit of data packets that exceed the maximum time delay and can be tolerated by a scheduled terminal i, $R_i(t)$ is the maximum data rate of the scheduled terminal i at the current t moment, $\overline{R_1(t)}$ is an average data rate of the scheduled terminal i, $D_i(t)$ is a queue time delay of a to-be-sent data cache area of the scheduled terminal i, $T_i$ is the maximum time delay that can be tolerated by the scheduled terminal i, $Q_{QCI}$ is a requirement grade identification of quality of service (QoS) corresponding to data service to be sent by the scheduled terminal i.

After acquiring the priority information and the geographical position information of the small cells, dichotomy or other classification method can be adopted for dividing the small cells into the active set and the restrained set. Requirements of small cells in the active set are preferentially satisfied, and requirements of small cells in the restrained set can be temporarily ignored, and the small cells in the restrained set is indicated to be in a non-sending state within a certain period.

S105, sending transmission control signaling to small cells in the third set, the active set and the restrained set, to make the small cells in the third set and the small cells in the active set start transmitting data after receiving the transmission control signaling, and to make the small cells in the restrained set enter the non-sending state within a channel occupation period after receiving the transmission control signaling.

After small cells that match conditions are filtered for multiple times and finally divided into the third set, the active set and the restrained set, request conflicts of the small cells in different sets can be processed, and the transmission control signaling is sent to the small cells in the third set, the active set and the restrained set, so as to make the small cells in the third set and the small cells in the active set start transmitting data after receiving the transmission control signaling, and to make the small cells in the restrained set enter the non-sending state within the channel occupation period after receiving the transmission control signaling.

Optionally, the transmission control signaling is transmitted through a licensed frequency band or through an interface between base stations. The safety and the stability are higher.

In the present disclosure, through clustering, a CCA detection, comparing with the preset interference threshold value, and multilevel filtering the small cells according to the priority information and the geographical location information, and through restraining a part of the small cells that cause interferences to the adjacent cells to send data, system interference of the inter-cell is reduced, the overall performance of the system is improved, and the interior of the small cell system, the LAA system and the Wi-Fi system can be coexisted better.

Figure 2:
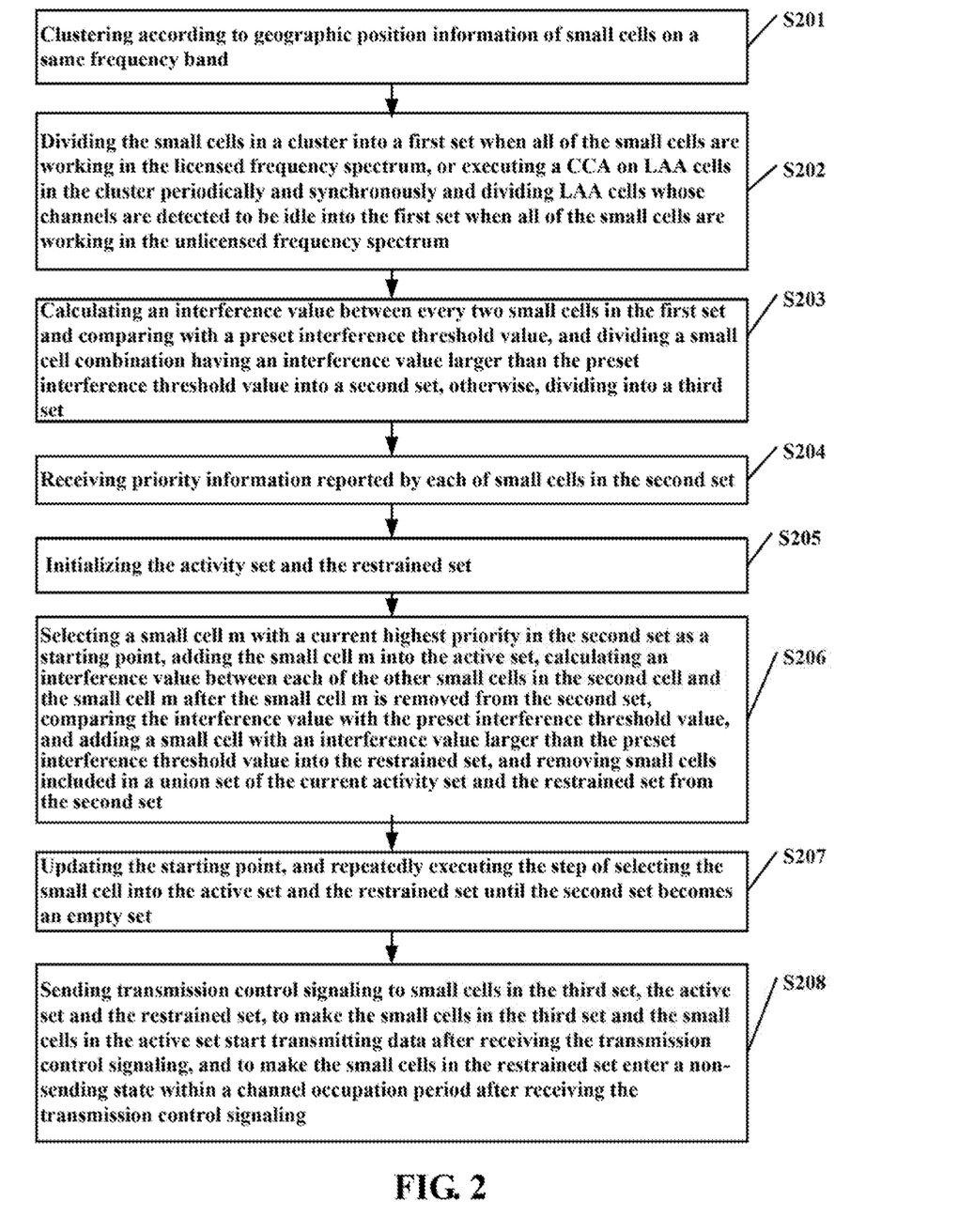
FIG. 2 is a flow diagram of a second embodiment of the judgment method of channel occupancy according to the present disclosure.

Please refer to FIG. 2, which is a flow diagram of a second embodiment of the judgment method of channel occupancy according to the present disclosure; in the embodiment, the judgment method includes the following steps:

S201, clustering according to geographic position information of small cells on a same frequency band.

Each of the small cells is a small cell working in a licensed frequency spectrum or each of the small cells is a LAA cell working in an unlicensed spectrum.

Specifically, a judgment function entity can read the geographic position information, such as coordinate information, of each of the small cells, mark adjacent small cells as a same cluster. The small cells in the cluster share information and are uniformly controlled by the judgment function entity. Dynamic allocation and intelligent management of resources are realized, and control signaling is borne. A licensed frequency band resource is occupied by information interaction between the judgment function entity and the small cells in the cluster, information of all of the small cells in the cluster can be updated periodically, and functions of various algorithms can be realized through software programming.

S202, when all of the small cells are small cells working in the licensed frequency spectrum, dividing the small cells in a cluster into a first set, or when all of the small cells are small cells working in the unlicensed frequency spectrum, after executing a CCA on LAA cells in the cluster periodically and synchronously, dividing LAA cells whose channels are detected to be idle into the first set.

For the unlicensed frequency spectrum, all LAA small cells deployed by the same operator in the cluster will carry out a CCA detection periodically and synchronously. Preliminary filtering of the LAA small cells can be realized through the CCA detection. The LAA small cells that pass the CCA successfully are selected for subsequent further filtering, and finally a LAA small cell set whose transmission requirements and preferable usage resources can be satisfied preferentially, and a LAA small cell set whose transmission requirements can be temporarily ignored and that does not occupy resources temporarily, are acquired.

S203, calculating an interference value between every two small cells in the first set and comparing with a preset interference threshold value, and dividing a small cell combination having an interference value larger than the preset interference threshold value into a second set, or dividing a small cell combination having an interference value equaling to or small than the preset interference threshold value into a third set.

The preset interference threshold value can be set by the judgment function entity according to historical data, and can also be set by a user according to experience, the embodiments of the present disclosure are not limited in any way.

The small cells in the first set can be further filtered through the interference threshold value, small cells with large mutual interference are combined into pairs or combinations, and then divided into a second set.

S204, receiving priority information reported by each of small cells in the second set.

After division based on a comparison with the preset interference threshold value, the small cells in the second set can actively calculate own priority and report obtained priority information to the judgment function entity, or the judgment function entity can instruct the small cells in the second set to execute steps of calculating the priority and reporting the obtained priority information.

Specifically, the priority information is determined by a small cell according to a scheduling level factor of a terminal served and activated by the small cell, a data cache area of the terminal is not empty. The scheduling level factor is used for representing a priority sequence of the terminal being scheduled. When there are a plurality of terminals exists, the maximum value of scheduling level factors of the plurality of terminals is selected to be a priority of the small cell.

The priority is specifically calculated according to the following formula:

$$\beta_k = \max_i \left\{ -lg(\delta_i) \cdot \frac{R_i(t)}{\overline{R_1(t)}} \cdot \frac{D_i(t)}{T_i} \cdot \frac{1}{Q_{QCI}} \right\}$$

In the formula, $\beta_k$ is a priority of the $k^{th}$ small cell in the first set in the same cluster, $\delta_i$ is a ratio upper limit of data packets that exceed the maximum time delay and can be tolerated by a scheduled terminal i, $R_i(t)$ is the maximum data rate of the scheduled terminal i at the current t moment, $\overline{R_1(t)}$ is an average data rate of the scheduled terminal i, $D_i(t)$ is a queue time delay of a to-be-sent data cache area of the scheduled terminal i, $T_i$ is the maximum time delay that can be tolerated by the scheduled terminal i, $Q_{QCI}$ is a requirement grade identification of quality of service (QoS) corresponding to data service to be sent by the scheduled terminal i.

After acquiring the priority information and the geographical position information of the small cells, dichotomy or other classification method can be adopted for dividing the small cells into the active set and the restrained set. Requirements of small cells in the active set are preferentially satisfied, and requirements of small cells in the restrained set can be temporarily ignored and is indicated to be in a non-sending state within a certain period.

S205, initializing the activity set and the restrained set.

After initialization, the active set and the restrained set are empty sets.

S206, selecting a small cell m with a current highest priority in the second set as a starting point, adding the small cell m into the active set, calculating an interference value between each of the other small cells in the second cell and the small cell m after the small cell m is removed from the second set, comparing the calculated interference value with the preset interference threshold value, and adding a small cell with an interference value larger than the preset interference threshold value into the restrained set, and removing small cells included in a union set of the current activity set and the restrained set from the second set.

S207, updating the starting point, and repeatedly executing S206 until the second set becomes an empty set.

By means of such a classification method, a part of small cells with higher priorities can be placed in the active set, meanwhile, another part of small cells that cause larger interference to the part of small cells with the higher priorities are placed to the restrained set, so as to achieve a more ideal classification result.

S208, sending transmission control signaling to small cells in the third set, the active set and the restrained set, to make the small cells in the third set and the small cells in the active set start transmitting data after receiving the transmission control signaling, and to make the small cells in the restrained set enter the non-sending state within a channel occupation period after receiving the transmission control signaling.

After small cells that match conditions are filtered for multiple times and finally divided into the third set, the active set and the restrained set, request conflicts of the small cells in different sets can be processed, and the transmission control signaling is sent to the small cells in the third set, the active set and the restrained set, so as to make the small cells in the third set and the small cells in the active set start transmitting data after receiving the transmission control signaling, and to make the small cells in the restrained set enter the non-sending state within the channel occupation period after receiving the transmission control signaling In the embodiment, when calculating priorities, service conditions of a terminal user and requirement difference of different services to the resources are comprehensively considered in the conflict back-off mechanism, thus resources can be more reasonably distributed, and QoS is improved. Management and control based on a virtualization network architecture are more flexible, a part of calculation burdens and signaling interactions at a small base station layer can be reduced, data analysis is achieved efficiently through an algorithm, and an optimal decision is obtained.

Figure 3:
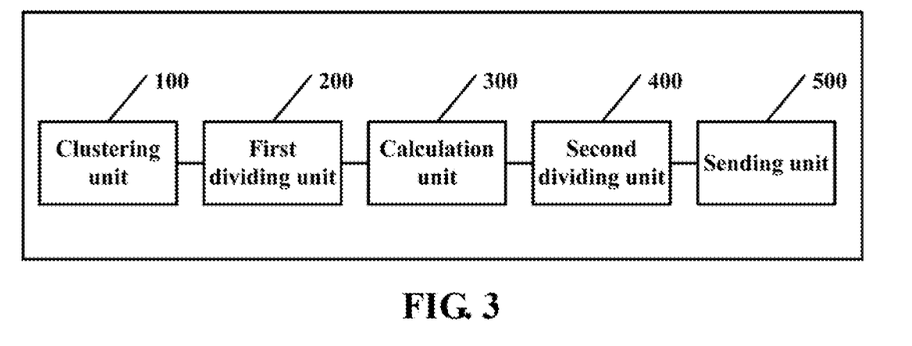
FIG. 3 is a composition diagram of an embodiment of a judgment device of channel occupation according to the present disclosure.

Please refer to FIG. 3, which is a composition diagram of an embodiment of a judgment device of channel occupation according to the present disclosure, in the embodiment, the judgment device includes:

A clustering unit 100, which is configured to cluster according to geographic position information of small cells on a same frequency band.

Each of the small cells is a small cell working in a licensed frequency spectrum or each of the small cells is a LAA cell working in an unlicensed spectrum;

Specifically, the judgment device can read the geographic position information, such as coordinate information, of each of the small cells, mark adjacent small cells as a same cluster. The small cells in the cluster share information and are uniformly controlled by the judgment device. Dynamic allocation and intelligent management of resources are realized, and control signaling is borne. A licensed frequency band resource is occupied by information interaction between the judgment device and the small cells in the cluster. The judgment device can periodically update information of all of the small cells in the cluster, and has software programming functions to realize various algorithms. In hardware implementation, the judgment device can be integrated in a software defined network (SDN) or can be defined independently.

A first dividing unit 200, which is configured to divide small cells in a cluster into a first set when all of the small cells are small cells working in the licensed frequency spectrum, or execute a clear channel assessment (CCA) on LAA cells in the cluster periodically and synchronously when all of the small cells are small cells working in the unlicensed frequency spectrum, and divide LAA cells whose channels are detected to be idle into the first set;

For the unlicensed frequency spectrum, all LAA small cells deployed by the same operator in the cluster will carry out a clear channel assessment (CCA) detection periodically and synchronously. Preliminary filtering of the LAA small cells can be realized through the CCA detection. The LAA small cells that pass the CCA successfully are selected for subsequent further filtering, and finally a LAA small cell set whose transmission requirements and preferable usage resources can be satisfied preferentially, and a LAA small cell set whose transmission requirements can be temporarily ignored and that does not occupy resources temporarily, are acquired.

A calculation unit 300, which is configured to calculate an interference value between every two small cells in the first set and compare with a preset interference threshold value, and divide a small cell combination having an interference value larger than the preset interference threshold value into a second set, or divide a small cell combination having an interference value equaling to or small than the preset interference threshold value into a third set.

The preset interference threshold value can be set by the judgment device according to historical data, and can also be set by a user according to experience, the embodiments of the present disclosure are not limited in any way.

Here, the small cells in the first set can be further filtered through the interference threshold value, small cells with large mutual interference are combined into pairs or combinations, which are divided into the second set.

A second dividing unit 400, which is configured to receive priority information reported by each of small cells in the second set, and divide the small cells in the second set into an active set and a restrained set according to the priority information and the geographic position information of each of the small cells;

After acquiring the priority information and the geographical position information of the small cells, dichotomy can be adopted for dividing the small cells into the active set and the restrained set. Requirements of small cells in the active set are preferentially satisfied, and requirements of small cells in the restrained set can be temporarily ignored, and the small cells in the restrained set is indicated to be in a non-sending state within a certain period.

After division based on a comparison with the preset interference threshold value, the small cells in the second set can actively calculate own priority and report obtained priority information to the judgment device, or the judgment device can instruct the small cells in the second set to execute steps of calculating the priority and reporting the obtained priority information.

Specifically, the priority information is determined by a small cell according to a scheduling level factor of a terminal served and activated by the small cell, a data cache area of the terminal is not empty. The scheduling level factor is used for representing a priority sequence of the terminal being scheduled. When there are a plurality of terminals exists, the maximum value of scheduling level factors of the plurality of terminals is selected to be a priority of the small cell.

The priority is specifically calculated according to the following formula:

$$\beta_k = \max_i \left\{ -lg(\delta_i) \cdot \frac{R_i(t)}{\overline{R_1(t)}} \cdot \frac{D_i(t)}{T_i} \cdot \frac{1}{Q_{QCI}} \right\}$$

In the formula, $\beta_k$ is a priority of the $k^{th}$ small cell in the first set in the same cluster, $\delta_i$ is a ratio upper limit of data packets that exceed the maximum time delay and can be tolerated by a scheduled terminal i, $R_i(t)$ is the maximum data rate of the scheduled terminal i at the current t moment, $\overline{R_1(t)}$ is an average data rate of the scheduled terminal i, $D_i(t)$ is a queue time delay of a to-be-sent data cache area of the scheduled terminal i, $T_i$ is the maximum time delay that can be tolerated by the scheduled terminal i, $Q_{QCI}$ is a requirement grade identification of quality of service (QoS) corresponding to data service to be sent by the scheduled terminal i.

A sending unit 500, which is configured to send transmission control signaling to small cells in the third set, the active set and the restrained set, to make the small cells in the third set and the small cells in the active set start transmitting data after receiving the transmission control signaling, and to make the small cells in the restrained set enter a non-sending state within a channel occupation period after receiving the transmission control signaling.

After small cells that match conditions are filtered for multiple times and finally divided into the third set, the active set and the restrained set, request conflicts of the small cells in different sets can be processed, and the transmission control signaling is sent to the small cells in the third set, the active set and the restrained set, so as to make the small cells in the third set and the small cells in the active set start transmitting data after receiving the transmission control signaling, and to make the small cells in the restrained set enter the non-sending state within the channel occupation period after receiving the transmission control signaling. Optionally, the transmission control signaling is transmitted through a licensed frequency band or through an interface between base stations. The second dividing unit 400 is specifically configured to:

Initialize the activity set and the restrained set;

Select a small cell m with a current highest priority in the second set as a starting point, adding the small cell m into the active set, calculate an interference value between each of the other small cells in the second cell and the small cell m after the small cell m is removed from the second set, compare the calculated interference value with the preset interference threshold value, and add a small cell with an interference value larger than the preset interference threshold value into the restrained set, and remove small cells included in a union set of the current activity set and the restrained set from the second set;

Update the starting point, and repeatedly execute the step of selecting the small cell into the active set and the restrained set until the second set becomes an empty set.

The above clustering unit 100, the first dividing unit 200, the calculation unit 300, the second dividing unit 400, and the sending unit 500 can be independently arranged and also can be integrated. The clustering unit 100, the first dividing unit 200, the calculation unit 300, the second dividing unit 400, and the sending unit 500 can be independently arranged in a hardware form independent of a processor of the judgment device of channel occupancy, and the hardware form can be a microprocessor; and can also be embedded in the processor of the judgment device in a hardware form; and can also be stored in a memory of the judgment device in a software form, so that the processor of the judgment device can invoke the above clustering unit 100, the first dividing unit 200, the calculation unit 300, the second division unit 400, and the sending unit 500, to execute corresponding operations.

For example, in the embodiments of the present disclosure of the judgment device of channel occupancy (the embodiment shown in FIG. 3), the calculation unit 300 can be a processor of the judgment device, the clustering unit 100, the first dividing unit 200, the second dividing unit 400, and the sending unit 500 can be embedded in the processor, or can be arranged independent of the processor, and can also be stored in the memory in the form of software and corresponding functions can be invoked by the processor. The embodiment of the present disclosure is not limited in any way. The above processor can be a central processing unit (CPU), a microprocessor, a single-chip microcomputer, etc.

The first dividing unit 100 and the second dividing unit 300 can be integrated, and also can be independently arranged. The sending unit 500 can be used as an interface circuit of the judgment device.

It should be noted that, various embodiments in the specification are described in a progressive manner, each of the embodiments highlights differences with the other embodiments, similar descriptions of all the embodiments can refer to each other.

For embodiments of the judgment device, they are basically similar to the method embodiments, thus, the descriptions of the judgment device are simple, relevant descriptions can be referred to the part of the method embodiments.

Through the description of the above embodiments, the judgment device has the following advantages:

Through clustering, a CCA detection, comparing with the preset interference threshold value, and multilevel filtering the small cells according to the priority information and the geographical location information, and through restraining a part of the small cells that cause interferences to the adjacent cells to send data, system interference of the inter-cell is reduced, the overall performance of the system is improved, and the interior of the small cell system, the LAA system and the Wi-Fi system can be coexisted better.

Figure 4:
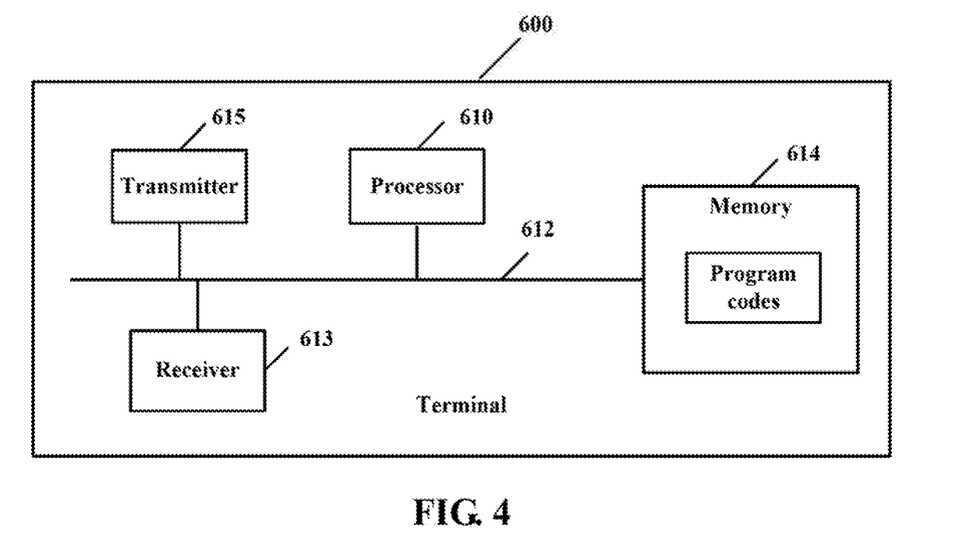
FIG. 4 is a schematic structural diagram of an embodiment of a terminal including a judgment device of channel occupation according to the present disclosure.

Please refer to FIG. 4, which is a schematic structural diagram of an embodiment of a terminal including a judgment device of channel occupation according to the present disclosure. A terminal 600 in the embodiment of the present disclosure can be different types of electronic devices, such as a smart phone, a tablet computer, a handheld computer, a mobile Internet device, a personal digital assistant, a media player, an intelligent TV, an intelligent watch, intelligent glasses, and an intelligent bracelet, etc. The judgment device of channel occupancy in the embodiment of the present disclosure is applied to the terminal 600.

As shown in FIG. 4, the terminal 600 in the embodiment of the present disclosure includes: at least one processor 610, such as a CPU, at least one receiver 613, at least one memory 614, at least one transmitter 615, and at least one communication bus 612. The communication bus 612 is used for realizing connection communications among these components. The receiver 613 and the transmitter 615 may be wired transmission ports, and can also be wireless equipments, such as an antenna device used for performing a data communication with other equipments. The memory 614 can be a high-speed random access memory (RAM) or a non-volatile memory, such as at least one magnetic disk storage.

The processor 610 can execute the operating system of the terminal 600, various installed application programs, and program codes etc., for example, each of the units described above, including the clustering unit 100, the calculation unit 300 etc.

The memory 614 stores program codes, and the processor 610 can invoke the program codes stored in the memory 614 through the communication bus 612, to execute related functions. For example, each of the units described in FIG. 3 (e.g., the clustering unit 100, the calculation unit 300 etc.) are program codes stored in the memory 614 and are executed by the processor 610, to invoke the function of each unit for realizing the judgment of the channel occupancy.

In one embodiment of the present disclosure, the memory 614 stores a plurality of instructions, which are executed by the processor 610 to realize the judgment method of channel occupancy. Specifically, the executions of the plurality of instructions by the processor 610 includes: clustering according to geographic position information of small cells on a same frequency band, each of the small cells being a small cell working in a licensed frequency spectrum or a LAA cell working in an unlicensed spectrum; when all of the small cells are small cells working in the licensed frequency spectrum, dividing the small cells in a cluster into a first set, or when all of the small cells are small cells working in the unlicensed frequency spectrum, after executing a clear channel assessment (CCA) on LAA cells in the cluster periodically and synchronously, dividing LAA cells whose channels are detected to be idle into the first set; calculating an interference value between every two small cells in the first set and comparing with a preset interference threshold value, and dividing a small cell combination having an interference value larger than the preset interference threshold value into a second set, or dividing a small cell combination having an interference value equaling to or small than the preset interference threshold value into a third set; receiving priority information reported by each of small cells in the second set, and dividing the small cells in the second set into an active set and a restrained set according to the priority information and the geographic position information of each of the small cells; sending transmission control signaling to small cells in the third set, the active set and the restrained set, to make the small cells in the third set and the small cells in the active set start transmitting data after receiving the transmission control signaling, and to make the small cells in the restrained set enter a non-sending state within a channel occupation period after receiving the transmission control signaling.

In a further embodiment, the priority information is determined by a small cell according to a scheduling level factor of a terminal scheduled by the small cell, and the scheduling level factor is used for representing a priority sequence of the terminal being scheduled. When there are a plurality of terminals exists, the maximum value of scheduling level factors of the plurality of terminals is selected to be a priority of the small cell.

In a further embodiment, the priority is calculated according to the following formula:

$$\beta_k = \max_i \left\{ -lg(\delta_i) \cdot \frac{R_i(t)}{\overline{R_1(t)}} \cdot \frac{D_i(t)}{T_i} \cdot \frac{1}{Q_{QCI}} \right\}$$

In the formula, $\beta_k$ is a priority of the $k^{th}$ small cell in the first set in the same cluster, $\delta_i$ is a ratio upper limit of data packets that exceed the maximum time delay and can be tolerated by a scheduled terminal i, $R_i(t)$ is the maximum data rate of the scheduled terminal i at the current t moment, $\overline{R_1(t)}$ is an average data rate of the scheduled terminal i, $D_i(t)$ is a queue time delay of a to-be-sent data cache area of the scheduled terminal i, $T_i$ is the maximum time delay that can be tolerated by the scheduled terminal i, $Q_{QCI}$ is a requirement grade identification of quality of service (QoS) corresponding to data service to be sent by the scheduled terminal i.

In a further embodiment, dividing the small cells in the second set into an active set and a restrained set according to the priority information and the geographic position information of each of the small cells, the executions of the plurality of instructions by the processor 610 further includes: initializing the activity set and the restrained set; selecting a small cell m with a current highest priority in the second set as a starting point, adding the small cell m into the active set, calculating an interference value between each of the other small cells in the second cell and the small cell m after the small cell m is removed from the second set, comparing the interference value with the preset interference threshold value, and adding a small cell with an interference value larger than the preset interference threshold value into the restrained set, and removing small cells included in a union set of the current activity set and the restrained set from the second set; updating the starting point, and repeatedly executing the step of selecting the small cell into the active set and the restrained set until the second set becomes an empty set.

In a further embodiment, the transmission control signaling is transmitted through a licensed frequency band or through an interface between base stations.

Specifically, implementation methods of the above instruction by the processor 610 can refer to the description of relevant steps in the corresponding embodiments in FIG. 1 and FIG. 2, and the description is not repeated herein.

Persons of ordinary skill in the art can understand that realization of all or part of the procedures in the methods of the above embodiments can be completed by instructing relevant hardware through a computer program, the program can be stored in a computer readable storage medium. When the program is executed, the program can include the flow of the embodiments of the above methods. The storage medium can be a magnetic disk, an optical disk, a read-only memory (ROM), or a random access memory (RAM) etc.

The above disclosed embodiments are only preferred embodiments of the present disclosure, and definitely, should not limit the scope of the present disclosure, accordingly, the equivalent changes that are made according to the claims of the disclosure are still within the scope of the disclosure.

We claim:
1. A judgment method of channel occupancy, comprising:
clustering according to geographic position information of small cells on a same frequency band, each of the small cells being a small cell working in a licensed frequency spectrum or a LAA cell working in an unlicensed spectrum;

when all of the small cells are small cells working in the licensed frequency spectrum, dividing the small cells in a cluster into a first set, or when all of the small cells are small cells working in the unlicensed frequency spectrum, after executing a clear channel assessment (CCA) on LAA cells in the cluster periodically and synchronously, dividing LAA cells whose channels are detected to be idle into the first set;

calculating an interference value between every two small cells in the first set and comparing with a preset interference threshold value, and dividing a small cell combination having an interference value larger than the preset interference threshold value into a second set, or dividing a small cell combination having an interference value equaling to or small than the preset interference threshold value into a third set;

receiving priority information reported by each of small cells in the second set, and dividing the small cells in the second set into an active set and a restrained set according to the priority information and the geographic position information of each of the small cells;

sending transmission control signaling to small cells in the third set, the active set and the restrained set, to make the small cells in the third set and the small cells in the active set start transmitting data after receiving the transmission control signaling, and to make the small cells in the restrained set enter a non-sending state within a channel occupation period after receiving the transmission control signaling.

2. The judgment method of claim 1, wherein the priority information is determined by the small cell according to a scheduling level factor of a terminal scheduled by the small cell, and the scheduling level factor is used for representing a priority sequence of the terminal being scheduled; when there are a plurality of terminals exists, the maximum value of scheduling level factors of the plurality of terminals is selected to be a priority of the small cell.

3. The judgment method of claim 2, wherein the priority is calculated according to a formula of:

$$\beta_k = \max_i \left\{ -lg(\delta_i) \cdot \frac{R_i(t)}{\overline{R_1(t)}} \cdot \frac{D_i(t)}{T_i} \cdot \frac{1}{Q_{QCI}} \right\}$$

wherein $\beta_k$ is a priority of the $k^{th}$ small cell in the first set in the same cluster, $\delta_i$ is a ratio upper limit of data packets that exceed the maximum time delay and can be tolerated by a scheduled terminal i, $R_i(t)$ is the maximum data rate of the scheduled terminal i at the current t moment, $\overline{R_1(t)}$ is an average data rate of the scheduled terminal i, $D_i(t)$ is a queue time delay of a to-be-sent data cache area of the scheduled terminal i, $T_i$ is the maximum time delay that can be tolerated by the scheduled terminal i, $Q_{QCI}$ is a requirement grade identification of quality of service (QoS) corresponding to data service to be sent by the scheduled terminal i.

4. The judgment method of claim 1, wherein dividing the small cells in the second set into the active set and a restrained set according to the priority information and the geographic position information of each of the small cells comprises:

initializing the activity set and the restrained set;

selecting a small cell m with a current highest priority from the small cells in the second set as a starting point, adding the small cell m into the active set, calculating an interference value between each of the other small cells in the second cell and the small cell m after the small cell m is removed from the second set, comparing the interference value with the preset interference threshold value, and adding a small cell with an interference value larger than the preset interference threshold value into the restrained set, and removing small cells comprised in a union set of the current activity set and the restrained set from the second set;

updating the starting point, and repeatedly executing the step of selecting the small cell into the active set and the restrained set until the second set becomes an empty set.

5. The judgment method of claim 4, wherein the transmission control signaling is transmitted through a licensed frequency band or through an interface between base stations.

6. A judgment device of channel occupancy, comprising:

a clustering unit configured to cluster according to geographic position information of small cells on a same frequency band, each of the small cells being a small cell working in a licensed frequency spectrum or a LAA cell working in an unlicensed spectrum;

a first dividing unit, configured to divide small cells in a cluster into a first set when all of the small cells are small cells working in the licensed frequency spectrum, or execute a clear channel assessment (CCA) on LAA cells in the cluster periodically and synchronously when all of the small cells are small cells working in the unlicensed frequency spectrum, and divide LAA cells whose channels are detected to be idle into the first set;

a calculation unit configured to calculate an interference value between every two small cells in the first set and compare with a preset interference threshold value, and divide a small cell combination having an interference value larger than the preset interference threshold value into a second set, or divide a small cell combination having an interference value equaling to or small than the preset interference threshold value into a third set;

a second dividing unit configured to receive priority information reported by each of small cells in the second set, and divide the small cells in the second set into an active set and a restrained set according to the priority information and the geographic position information of each of the small cells;

a sending unit configured to send transmission control signaling to small cells in the third set, the active set and the restrained set, to make the small cells in the third set and the small cells in the active set start transmitting data after receiving the transmission control signaling, and to make the small cells in the restrained set enter a non-sending state within a channel occupation period after receiving the transmission control signaling.

7. The judgment device of claim 6, wherein the priority information is determined by the small cell according to a scheduling level factor of a terminal scheduled by the small cell, and the scheduling level factor is used for representing a priority sequence of the terminal being scheduled; when there are a plurality of terminals exists, the maximum value of scheduling level factors of the plurality of terminals is selected to be a priority of the small cell.

8. The judgment device of claim 7, wherein the priority is calculated according to a formula of:

$$\beta_k = \max_i \left\{ -lg(\delta_i) \cdot \frac{R_i(t)}{\overline{R_1(t)}} \cdot \frac{D_i(t)}{T_i} \cdot \frac{1}{Q_{QCI}} \right\}$$

wherein $\beta_k$ is a priority of the $k^{th}$ small cell in the first set in the same cluster, $\delta_i$ is a ratio upper limit of data packets that exceed the maximum time delay and can be tolerated by a scheduled terminal i, $R_i(t)$ is the maximum data rate of the scheduled terminal i at the current t moment, $\overline{R_1(t)}$ is an average data rate of the scheduled terminal i, $D_i(t)$ is a queue time delay of a to-be-sent data cache area of the scheduled terminal i, $T_i$ is the maximum time delay that can be tolerated by the scheduled terminal i, $Q_{QCI}$ is a requirement grade identification of quality of service (QoS) corresponding to data service to be sent by the scheduled terminal i.

9. The judgment device of claim 6, wherein the second dividing unit is specifically configured to:
   initialize the activity set and the restrained set;
   select a small cell m with a current highest priority from the small cells in the second set as a starting point, add the small cell m into the active set, calculate an interference value between each of the other small cells in the second cell and the small cell m after the small cell m is removed from the second set, compare the interference value with the preset interference threshold value, and add a small cell with an interference value larger than the preset interference threshold value into the restrained set, and remove small cells comprised in a union set of the current activity set and the restrained set from the second set;
   update the starting point, and repeatedly execute the step of selecting the small cell into the active set and the restrained set until the second set becomes an empty set.

10. The judgment device of claim 9, wherein the transmission control signaling is transmitted through a licensed frequency band or through an interface between base stations.

11. A terminal, comprising:
   a processor; and
   a memory storing a plurality of instructions, which when executed by the processor, causes the processor to:
   cluster according to geographic position information of small cells on a same frequency band, each of the small cells being a small cell working in a licensed frequency spectrum or a LAA cell working in an unlicensed spectrum;
   when all of the small cells are small cells working in the licensed frequency spectrum, divide the small cells in a cluster into a first set, or when all of the small cells are small cells working in the unlicensed frequency spectrum, after executing a clear channel assessment (CCA) on LAA cells in the cluster periodically and synchronously, divide LAA cells whose channels are detected to be idle into the first set;
   calculate an interference value between every two small cells in the first set and comparing with a preset interference threshold value, and divide a small cell combination having an interference value larger than the preset interference threshold value into a second set, or divide a small cell combination having an interference value equaling to or small than the preset interference threshold value into a third set;
   receive priority information reported by each of small cells in the second set, and divide the small cells in the second set into an active set and a restrained set according to the priority information and the geographic position information of each of the small cells;
   send transmission control signaling to small cells in the third set, the active set and the restrained set, to make the small cells in the third set and the small cells in the active set start transmitting data after receiving the transmission control signaling, and to make the small cells in the restrained set enter a non-sending state within a channel occupation period after receiving the transmission control signaling.

12. The terminal of claim 11, wherein the priority information is determined by the small cell according to a scheduling level factor of a terminal scheduled by the small cell, and the scheduling level factor is used for representing a priority sequence of the terminal being scheduled; when there are a plurality of terminals exists, the maximum value of scheduling level factors of the plurality of terminals is selected to be a priority of the small cell.

13. The terminal of claim 12, wherein the priority is calculated according to a formula of:

$$\beta_k = \max_i \left\{ -lg(\delta_i) \cdot \frac{R_i(t)}{\overline{R_1(t)}} \cdot \frac{D_i(t)}{T_i} \cdot \frac{1}{Q_{QCI}} \right\}$$

wherein $\beta_k$ is a priority of the $k^{th}$ small cell in the first set in the same cluster, $\delta_i$ is a ratio upper limit of data packets that exceed the maximum time delay and can be tolerated by a scheduled terminal i, $R_i(t)$ is the maximum data rate of the scheduled terminal i at the current t moment, $\overline{R_1(t)}$ is an average data rate of the scheduled terminal i, $D_i(t)$ is a queue time delay of a to-be-sent data cache area of the scheduled terminal i, $T_i$ is the maximum time delay that can be tolerated by the scheduled terminal i, $Q_{QCI}$ is a requirement grade identification of quality of service (QoS) corresponding to data service to be sent by the scheduled terminal i.

14. The terminal of claim 11, wherein the processor further:
   initialize the activity set and the restrained set;
   select a small cell m with a current highest priority from the small cells in the second set as a starting point, add the small cell m into the active set, calculate an interference value between each of the other small cells in the second cell and the small cell m after the small cell m is removed from the second set, compare the interference value with the preset interference threshold value, and add a small cell with an interference value larger than the preset interference threshold value into the restrained set, and remove small cells comprised in a union set of the current activity set and the restrained set from the second set;
   update the starting point, and repeatedly execute the step of selecting the small cell into the active set and the restrained set until the second set becomes an empty set.

15. The terminal of claim 14, wherein the transmission control signaling is transmitted through a licensed frequency band or through an interface between base stations.

* * * * *